April 11, 1967     S. A. JURES     3,313,059

FISH LURE

Filed Nov. 19, 1964

INVENTOR.
Steve A. Jures
BY
Charles S. Penfold
ATTORNEY

United States Patent Office 3,313,059
Patented Apr. 11, 1967

3,313,059
FISH LURE
Steve A. Jures, 18766 Williams St.,
Lansing, Ill. 60438
Filed Nov. 19, 1964, Ser. No. 412,484
9 Claims. (Cl. 43—42.16)

The subject invention relates generally to fishing tackle and more particularly is directed to an artificial lure.

An important object of the subject invention is to provide a lure comprising an elongate body which simulates a live minnow having a head and tail, an assembly comprising a hook structure and a spinner, and means operatively connecting the assembly to the body at a desirable location for trailing movement relative thereto.

A significant objective of the invention is to provide a lure of the above character in which the assembly comprised of the hook structure and spinner is preferably flexibly connected to the body at a location between its center and its tail so that the assembly may be caused to normally assume any one of a number of infinite trailing positions substantially above and/or to the rear of the tail.

Another object of the invention is to provide a connection between the spinner and hook structure which is preferably in the form of a ring extending through an eye of the hook structure and a hole in the spinner whereby to afford free relative movement between these components.

A further object of the invention is to provide a connection between the body and assembly which is preferably in the form of a swivel having opposite ends which are respectively loosely connected to the ring and to the body in a manner whereby the assembly may reversely rotate about its axis as well as assume various trailing positions relative to the body, as above referred to, depending on the mode in which the lure is utilized or manipulated by a fisherman.

Also, an object of the invention is to provide a lure of the character above described in which the body and spinner are preferably constructed of metal which is highly polished or finished whereby to render the lure highly reflective in the water and thereby promote its attraction for fish.

A specific object of the invention is to provide the spinner with a depression or pocket and in which the spinner and hook structure are so operatively connected that at least a portion of the hook structure may be caused to nest in the depression, depending on the manner in which the lure is manipulated in the water.

A specific object of the invention is to provide a lure having a substantially vertical planar body portion and a planar down-turned tail portion whereby the latter, among other things, serves to impart an oscillating or wagging motion to the lure when pulled through water and in which this action, in combination with the tail portion, functions to deflect weeds from the hook structure.

Additional objects of the invention reside in providing a lure which offers advantages with respect to design and construction, variations of actions or motions, manufacture and assembly, efficiency, durability and ability to catch fish.

Additional objects and advantages of the invention will become apparent after the description set forth is considered in conjunction with the drawings annexed hereto.

Figure 1:
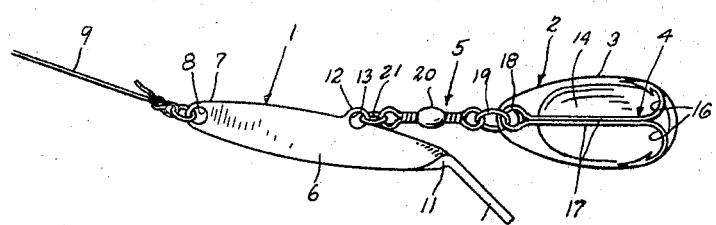
FIGURE 1 is a side elevational view of the lure showing one of the many positions it may be caused to assume when being pulled through a body of water.

Referring now particularly to FIGURE 1 of the drawing, the lure exemplified therein includes an elongate member generally designated 1 and an assembly or unit generally designated 2 which is comprised of an element 3 and a hook structure generally designated 4. The member and assembly are operatively connected by a means generally designated 5.

The member 1 is preferably designed and constructed to simulate a live bait, such as a minnow having a body portion 6, a head or fore end 7 provided with an opening 8 whereby to facilitate attachment of a line 9 thereto and a tail portion 10. The body portion 6 is preferably made relatively thin and planar and the tail portion 10 is substantially planar and triangular in shape. The tail is preferably twisted, as indicated at 11, so that the tail portion is disposed in a plane which is substantially perpendicular to the plane of the body portion 6 and at an oblique angle with respect to the longitudinal axis of such body portion. Otherwise expressed, the tail portion 10 is disposed in a downturned inclined plane, as distinguished from the vertical plane of the body portion 6.

The member 1 may be constructed of any material suitable for the purpose but is preferably cut from a sheet of planar sheet metal stock having substantially non-corrosive and highly reflective properties for purposes of protection and attracting fish.

The upper part of the body portion is preferably provided with a raised portion or ear 12 which is preferably located closer to the tail or slightly to the rear of the center of the body and provided with means, such as an aperture 13, whereby to facilitate attachment of the connection means 5 thereto.

The assembly generally designated 2 comprised of the element 3 and the hook structure 4 will now be described. These components may be designed and constructed in various ways but, as herein exemplified, the element 3 is preferably made in the form of an elongate spinner substantially of oval shape which is dished or provided with an elongate oval depression or pocket 14. This spinner constitutes an attraction means for fish and may be constructed out of any material suitable for the purpose, such as a non-corrosive metal which may be highly polished or finished to promote attraction. The spinner is preferably provided with a hole 15 at its fore end. Attention is directed to the fact that the use of the words "dished," "depression" and "pocket" are to be used synonymously for the reason that the spinner may be made concavo-convex in cross section or in the form specifically illustrated.

The hook structure 4 may also be designed and constructed as desired, but as herein shown, is preferably comprised of a pair of hooks 16 having shanks 17 which are resiliently held in abutting relation by an eye 18 whereby to locate the curved portions and barbs of the hooks in diverging planes forming an acute angle as shown. The term hook structure is intended to include a unitized pair of hooks as illustrated, a single hook, a pair of separate hooks or a treble hook structure.

The spinner and hook structure may be operatively connected together in any mode desired but, as herein shown, they are preferably connected together by means of a ring or link 19 which extends through the eye 18 of the hook structure and the hole 15 in the spinner so that the spinner and hook structure may readily move relative to one another. Attention is directed to the fact that the shapes and sizes of the spinner and hook structure are preferably such that rear portions of the shanks of the hook structure may be caused to nest in the depression 14 in such a manner that the barbs of the hooks will be maintained substantially equidistant from a medial line or the longitudinal axis of the spinner. The eye 18 of the hook structure, which is common to both of the shanks is disposed in a single plane therewith so that it may engage a fore portion of the spinner whereby to assist in maintaining the barbs in the positions just referred to. In other words, the lure is so constructed that the hook structure may be stabilized in at least one of its engaged positions with the spinner. It is, of course, to be understood that the connection between the spinner and hook structure is such that they may assume any one of an infinite number of relative positions with respect to one another including the nested position shown in FIGURE 1 or the spaced position illustrated in FIGURE 3.

Any means suitable for the purpose may be employed for operatively connecting the assembly 2 to the body but, as exemplified herein, a swivel type of connection is preferably employed. This swivel connection is preferably established by connecting one end of a swivel 20 to the ring or link 19 and the other end of the swivel is preferably connected to the body by means of a ring or link 21 which extends through this end of the swivel and the aperture 13 provided in the raised portion or ear 12 of the body. The rings may be of a split resilient character so as to facilitate detachable connection of the swivel to the body as well as between the assembly and and the swivel and between the spinner and hook structure. It might be stated that the aforesaid connections are of a flexible character due to the relative movement afforded between the various components. It is to be noted that the length of the connection including the swivel is preferably such that the spinner and hook structure are located for use preferably in a trailing position above and/or to the rear of the tail portion of the lure body.

Figure 2:
FIGURE 2 is a transverse section taken through the lure body for the purpose of illustrating the structural characteristics of the tail portion and one of the motions imparted to the lure when it is being pulled through water.
Figure 3:
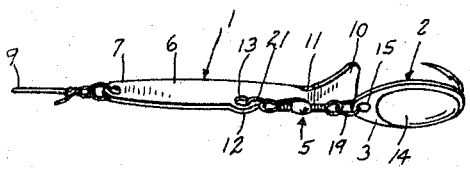
FIGURE 3 is a side elevational view of the lure illustrated in FIGURE 1 showing another of its operating positions and the fact that the assembly comprised of the hook structure and spinner may oscillate in opposite directions.
Figure 4:
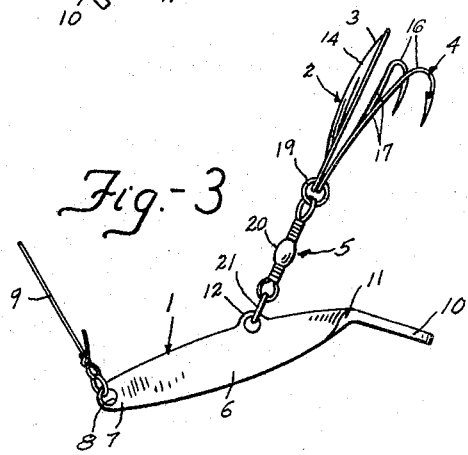
FIGURES 4 and 5 illustrate different oscillating or rolling positions of the lure and complement the disclosure of FIGURE 2.
Figure 5:
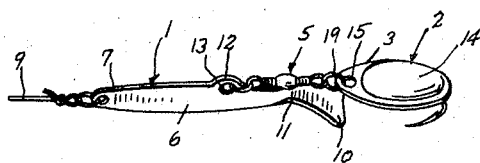
Figure 6:
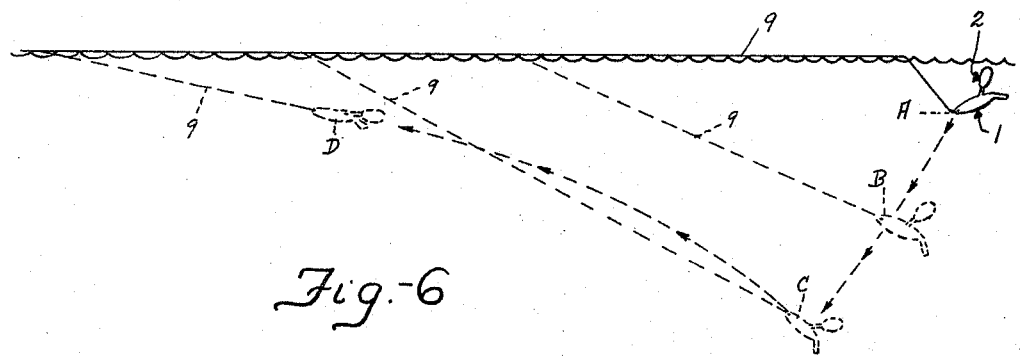
FIGURE 6 is a diagrammatic view exemplifying various ways in which a line may be manipulated to locate the lure in different operative positions, as well as different positions between the lure body and the assembly attached thereto.

Referring to the operation of the lure, and particularly to FIGURE 1, when the lure is pulled through the water, the swivel and assembly will generally assume coaxially aligned positions disposed in an acute angular relationship to the longitudinal axis of the body. Attention is directed to the fact that when the lure is thus pulled, the spinner and hook structure will be maintained in a relatively close or engaging relationship with a portion of the hook structure nested in the depression. This affords a setup whereby the assembly may reversely rotate about its longitudinal axis as indicated by the arrows in FIGURE 3. Attention is also directed to the important fact that the body of the lure may also roll, oscillate or nose up and down depending on the pull or manipulation of the line and that the relative positions between the spinner and hook structure and the assembly and the body may vary. Certain of these motions or actions are illustrated in the drawing. For example, in FIGURE 6 when the line is relaxed, the lure will descend and tend to nose downwardly with the assembly assuming a substantially vertical trailing position as depicted at A and then to a lower position B. When the lure is being retrieved by pulling on the line, the lure tends to gradually align itself with the line from position C to position D. The position D substantially corresponds to the position of the lure in FIGURE 1. In some instances, the spinner and hook structure will separate in a more or less divergent relationship as shown in FIGURE 3. The rolling actions of the lure are exemplified in FIGURES 2, 4 and 5. The lure tends to quiver or shimmy during certain portions of its travel in the water and when this occurs in combination with other motions and the reflective properties of the body and spinner, the attraction of the lure for fish is promoted. The tail portion serves to promote a tail wagging action to the lure which in turn causes its upper and lower planar surfaces to flutter and flash reflections visible to fish substantially in all directions since the position of such surfaces is inclined to the surface of the water.

Attention is directed to the fact that, since the lure body is substantially planar throughout the major portion of its length, and the points of connection between the assembly 2 and the line 9 and the body are spaced apart the body will normally substantially assume a vertical position and this serves to promote downward movement or descent of the lure in the water.

Of further significance is the fact that since the portions of the shanks of the hooks rest or nest in the depression of the spinner only the barbs and bent portions of the hooks are visible as the spinner and hook structure simultaneously rotate. Also, the assembly is so constructed and connected to the body that the body will be caused to move from side to side particularly at the point where the swivel is attached. The rotation of the spinner, with the tail portion of the body moving from side to side, casts off reflections visible to the fish from different areas and particularly from the rear.

The lure may be retrieved very slowly and still have a very effective action, or it can be cast out and allowed to sink in deep water and while doing so, the body, by gravity, keeps the spinner revolving as it passes into deep areas where fish may be feeding. Also, if desired, the lure may be manipulated so that it may be caused to bump along the bottom whereby to promote jigging for attracting fish. The lure may be used in any mode but is primarily adapted for use as a deep running or medium depth lure. As pointed out above, the oscillating, wobbling or wagging action of the lure, in combination with the structural characteristics of the tail portion, assists in deflecting weeds from the lure body and/or assembly.

The lure has proven efficient with respect to catching trout, large and small mouth black bass, crappies, bluegills, perch and northern and walleyed pike.

Having thus described my invention, it is obvious that various modifications may be made in the same without departing from the spirit of the invention and, therefore, I do not wish to be understood as limiting myself to the exact forms, constructions, arrangements, and combinations of parts herein shown and described.

I claim:

1. A lure of the character described comprising an elongate substantially flat body simulating a minnow, said body having a head provided with means facilitating attachment of a line thereto and also having a planar tail portion, an assembly comprising a spinner and a hook structure, and means flexibly connecting said assembly to an upper portion of said body at a location forwardly of said tail portion whereby said assembly may be caused to trail above said tail portion when the lure is pulled through water.

2. The lure defined in claim 1, in which said tail portion is twisted to locate it in a plane substantially perpendicular to the remainder of said body.

3. The lure defined in claim 1, in which said spinner is of an oval shape and provided with an elongate shaped depression so that at least a portion of the hook structure may nest therein depending on the relative position of said spinner and hook structure.

4. A lure for fishing, said lure comprising an elongate substantially planar body having a fore end for attachment to a line and a planar tail portion disposed in a plane perpendicular to the plane of the body and at an oblique angle with reference to its longitudinal axis, an assembly comprising a spinner provided with a depression and a hook structure and means connecting said spinner and said hook structure so that at least a portion of the hook structure may nest in the depression, and a swivel connection operatively connecting said connecting means to the upper portion of said body at a location forwardly of said tail portion so that when the lure is pulled by a line in water, the assembly will be substantially located in a horizontal trailing position above and rearwardly of said tail portion and when the pull on the line is relaxed the assembly will assume a substantially vertical trailing position as the lure descends in a substantially vertical plane.

5. The lure defined in claim 1, in which said tail portion is disposed in a plane perpendicular to the plane of the remainder of the body and at an oblique angle with reference to the longitudinal axis of the remainder of the body.

6. The lure defined in claim 1, in which said flexibly connecting means comprises a swivel whereby said assembly may reversely rotate.

7. The lure defined in claim 1, in which said body is provided with highly reflective external surfaces.

8. The lure defined in claim 1, in which said flexibly connecting means is of a length whereby the major portion of the assembly may be caused to trail beyond said tail portion.

9. A lure for fish, said lure comprising an elongate thin planar body, said body having a head for attachment to a line and a planar tail disposed in a plane transverse to the plane of the body and at a downturned oblique angle with reference to the longitudinal axis of said body, said tail being joined to said body by a twisted portion integrally joining said body and said tail, and an assembly comprising a spinner and a hook structure flexibly connected to an upper portion of said body at a location forwardly of said tail whereby said assembly may be caused to trail above and rearwardly of said tail when the lure is pulled through water.

References Cited by the Examiner

UNITED STATES PATENTS

| | | | |
|---|---|---|---|
| 681,308 | 8/1901 | Geen | 43—42.04 |
| 2,159,230 | 5/1939 | Sage | 43—42.16 |
| 2,294,082 | 8/1942 | Fairfax | 43—42.04 |
| 2,500,477 | 3/1950 | Walker | 43—42.44 |
| 2,561,515 | 7/1951 | Keeler | 43—42.47 X |
| 2,768,466 | 10/1956 | Reed | 43—42.47 X |

FOREIGN PATENTS 454,263    1/1949    Canada.

SAMUEL KOREN, *Primary Examiner.*

D. J. LEACH, *Assistant Examiner.*